June 6, 1961

TAKEO KATO 2,986,774

MACHINE FOR THE PRODUCTION OF HOLLOW GOODS
CONSISTING OF SYNTHETIC RESIN

Filed Feb. 4, 1958

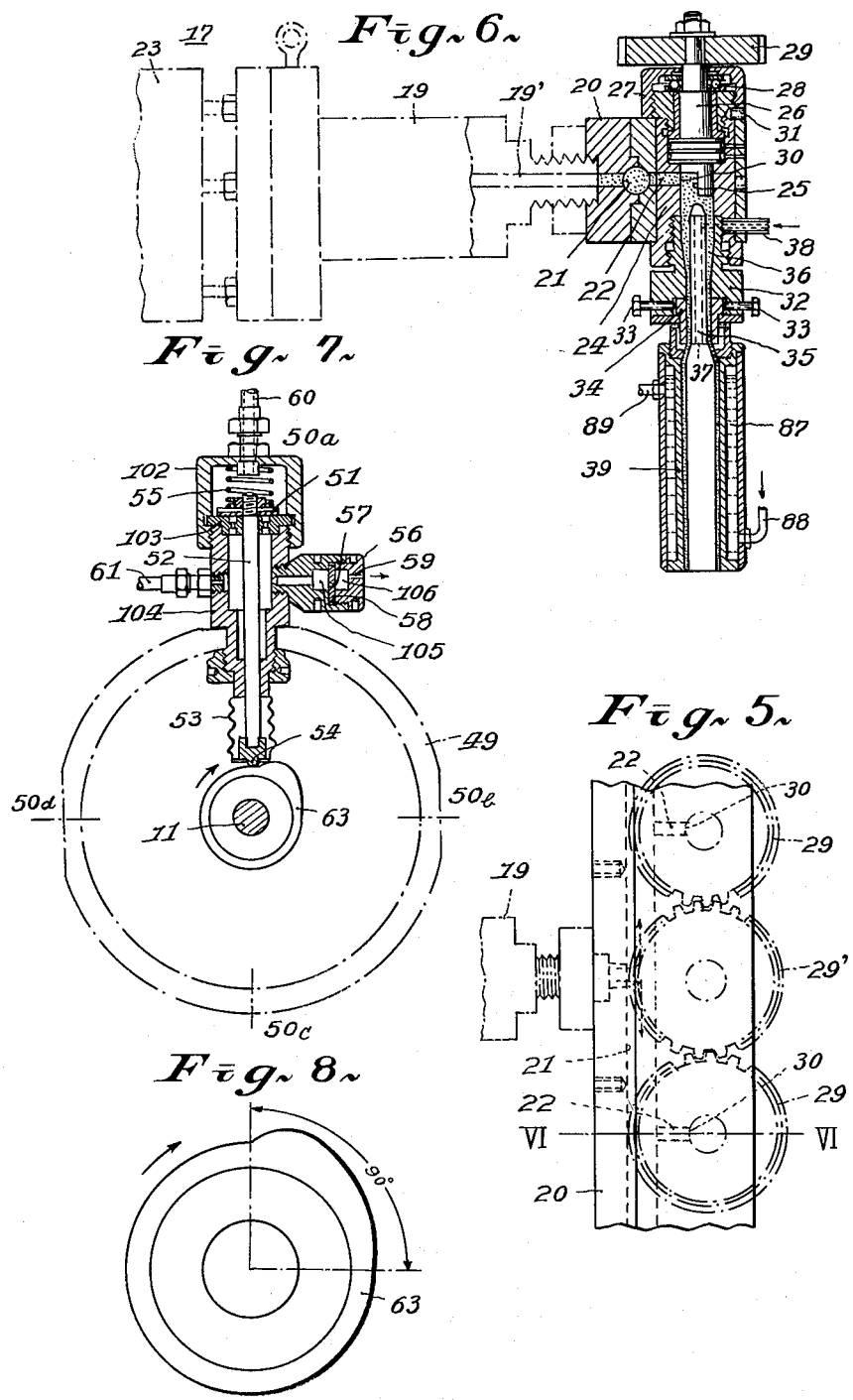

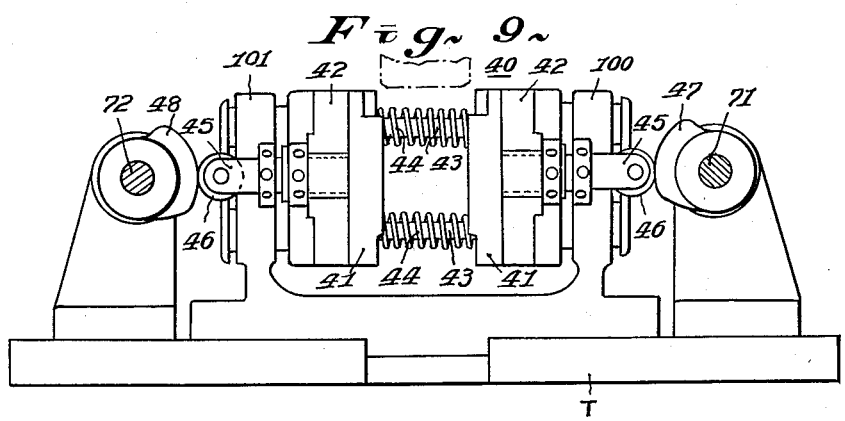
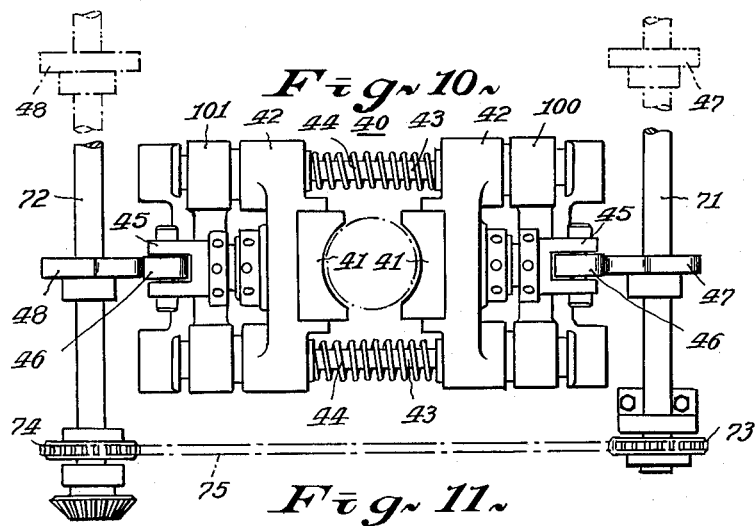
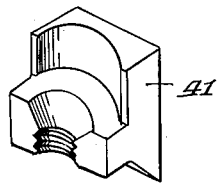

though the present invention is extensively described and illustrated, the invention is not limited to the particular embodiment shown.

United States Patent Office 2,986,774
Patented June 6, 1961

2,986,774
MACHINE FOR THE PRODUCTION OF HOLLOW GOODS CONSISTING OF SYNTHETIC RESIN

Takeo Kato, No. 70, Higashi 4-Chome, Magome-Machi, Ota-ku, Tokyo, Japan
Filed Feb. 4, 1958, Ser. No. 713,179
8 Claims. (Cl. 18—5)

This invention relates to a machine for the production of hollow goods, such as bottles, flasks, test tubes, hollow toys, hollow umbrella ribs or the like, made of synthetic resin. More specifically to say, this invention too relates to improvements in or relating to a machine, wherein the synthetic resin material, such as polyethylene, polyvinyl chloride or the like, is fluidized at an elevated temperature, and formed provisionally in tubes, each of which is then surrounded by a mould, swelled out under pressure onto the inside wall of said mould to produce the desired goods.

One of the objects of this invention is to provide a machine, by which the desired hollow goods provided with any desired wall thickness and size are produced easily and freely and without the necessity of exceedingly high temperature and pressure, as well as without special skilled labor.

Another object of this invention is to provide a machine of the class hereinbefore mentioned, which operates substantially without any idle periods between material charging and products moulding, resulting in an economical and continuous operation with practically no loss of energy, which is otherwise encountered by frequent stopping and restarting of the machine.

A still other object of this invention is to provide the machine of the kind above referred to, which is of a compact as well as simple construction, wherein, especially swelling out operations are carried out selectively in succession.

A further object of this invention is to provide a machine of the kind already described, by which with relatively smaller quantity of material stronger and larger products than obtainable on conventional machines can be produced.

A still further object of this invention is to provide a machine of the kind referred to, by which the products having highly smooth surfaces and high quality can be obtained.

A still another object of this invention is to provide a machine of the kind already mentioned, by which desired goods having least casting fins thereon, and in which the products may be easily taken out from the moulds.

A still further object of the invention is to provide a machine of the kind above referred to, by which the hollow synthetic resin goods are produced continuously with high efficiencies at a lower cost.

A still another object of this invention resides in that the machine itself can be constructed more economically than in the case of conventional machines.

These and other objects, features and special effects of the invention will appear more in detail in the following description referring to the accompanying drawings, in which a preferred embodiment of this invention having four bottle-making sets is illustrated by way of example.

It is specifically to be emphasized, that the embodiment is for the purpose of illustration only and not intended to limit the invention thereto.

In the drawings:

FIG. 5 is an enlarged plan view of part of the machine;

FIG. 6 is a sectional view taken on the line VI—VI in FIG. 5, especially illustrating material supplying means, die assembly, and tube making assembly;

FIG. 7 is a sectional view of air supply valve assembly, of which, however, only one valve unit is shown for the clearness of drawing;

FIG. 8 represents an enlarged front view of the cam controlling the valve assembly;

FIG. 9 is a side view, showing part of neck forming split moulds with the operating mechanism for the latter;

FIG. 10 shows a plan view thereof;

FIG. 11 represents a perspective view of one of the split moulds;

Figure 1:
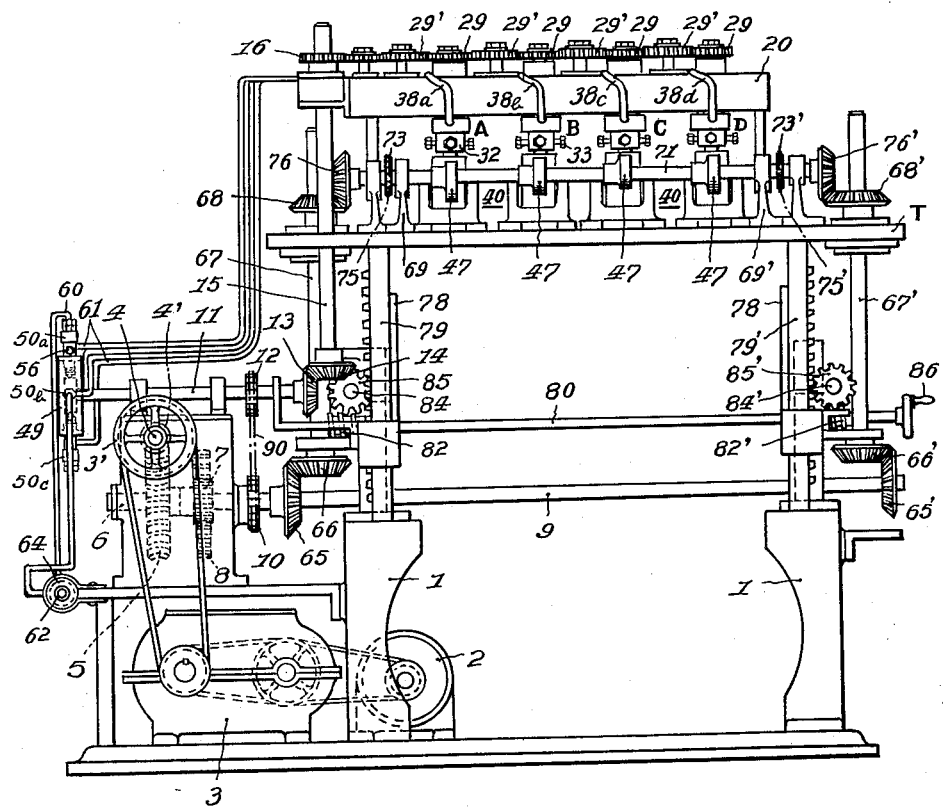
FIG. 1 shows a front view of the machine, according to this invention, specifically designed to produce bottles as hollow synthetic resin goods.
Figure 2:
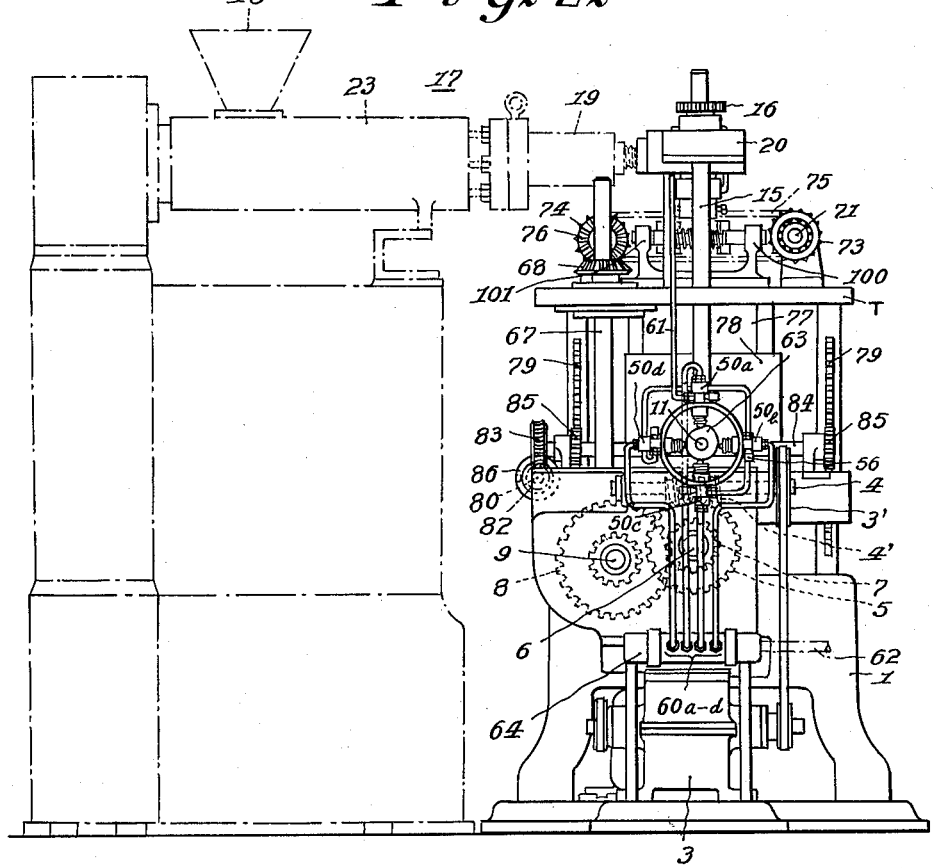
FIG. 2 represents an end view thereof.
Figure 3:
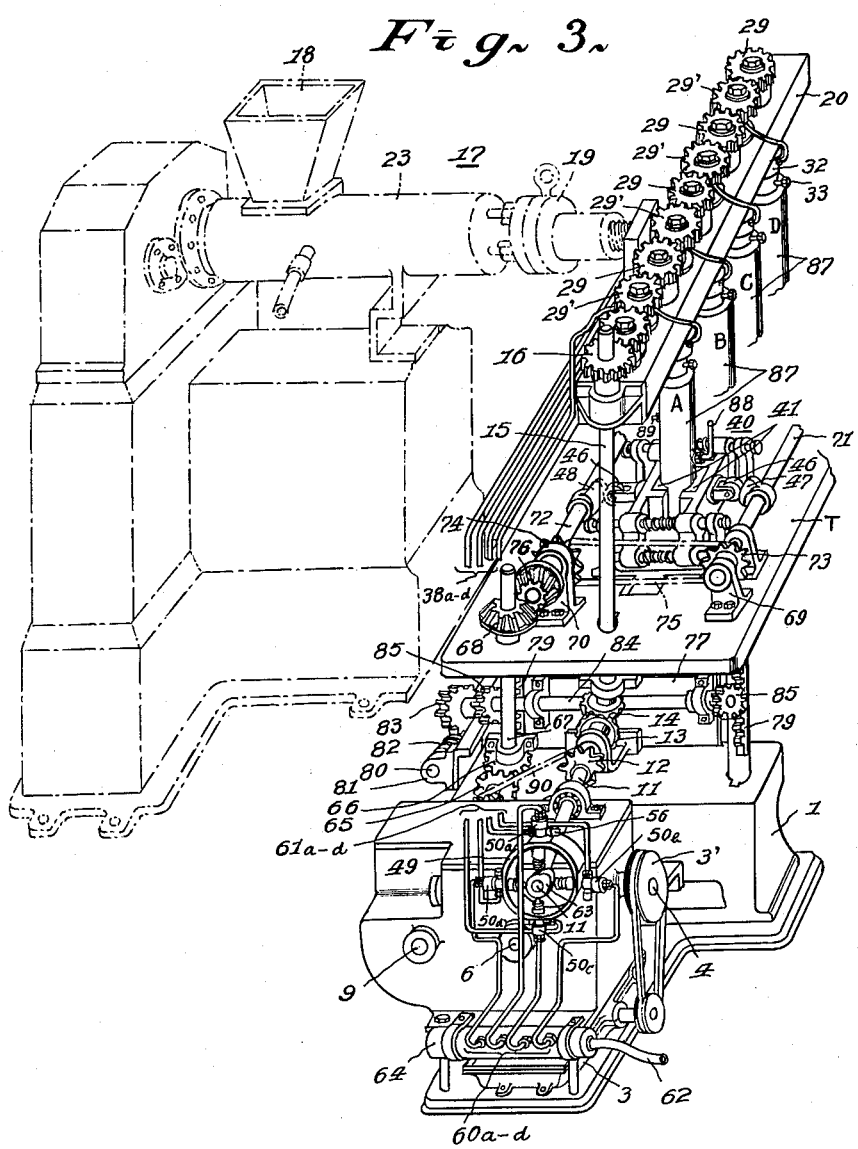
FIG. 3 is a perspective view thereof, seeing from the front and left side of the machine.
Figure 4:
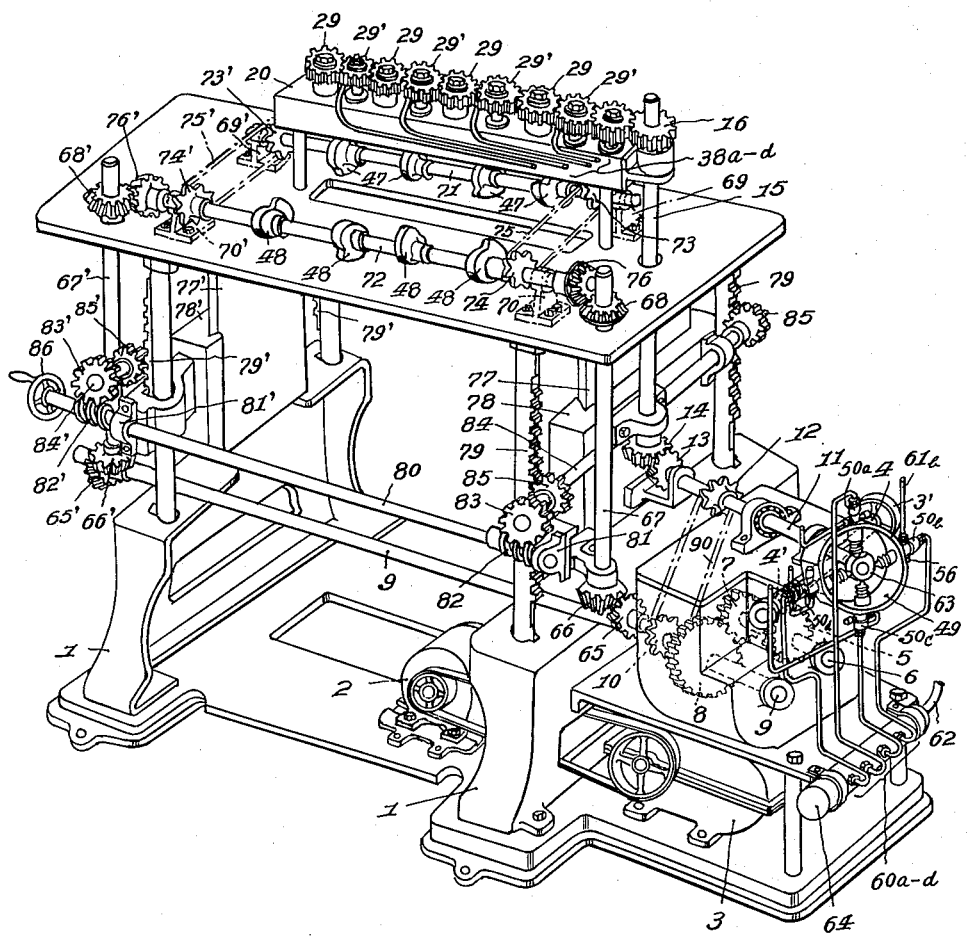
FIG. 4 is a further perspective view thereof, substantially seeing from the back side of the machine.
Figure 12:
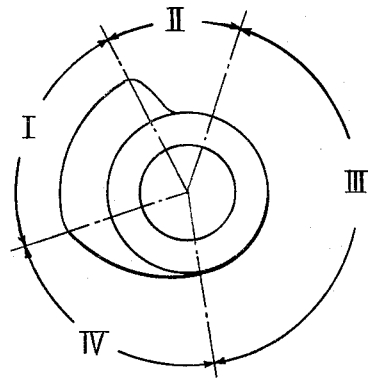
FIG. 12 shows an enlarged front view of one of the operating cams to control the slides for said split moulds and of the cooperating cam roller.

Now referring to FIGS. 1–4, 1 denotes the machine frame, in which a side shaft 9 is rotatably supported, said shaft being driven from an electric motor 2 through speed change gearing 3, pulley 3', worm shaft 4, worm 4', worm gear 5, worm shaft 6 and spur gearing 7, 8. These driving and transmission means are seen at the left side of FIG. 1. An intermediate shaft 11 is arranged in parallel to said side shaft 9 and is driven from the latter. For this purpose shafts 9 and 11 are provided with chain wheels 10 and 12, which are connected by a chain as shown. The shaft 11 is provided at its one end with a bevel gear 13, which meshes with the mating gear 14, the latter being fixed on the lower end of a vertical shaft 15, which is, in turn, provided with a driving gear 16 at its upper end, the latter gear serving to drive a gear train comprising a plurality of mating gears adapted to operate several sets of rotary valves as explained more in detail hereinafter.

The material feeder is shown in the drawings generally by a reference number 17 and comprises a hopper 18, a heating and feeding cylinder 23 and a die holder 19 fixed thereon, the latter being provided with a passage 19', which direct-communicates with a lateral (seen in FIG. 6) passage 21 in the die 20. The passage 21 is of a circular cross-section as shown and communicates with a plurality of branch passages 22, the number of which corresponds to that of bottle manufacturing sets employed in the machine. In the preferred embodiment shown in the drawings, four such sets are represented by way of example, although the invention is not intended to be limited thereto.

To the die 20 is attached a sleeve 24, in which is inserted a rotary valve member 26, which is, in turn, provided with a recess 25 at its lower end and with a toothed wheel 29 at its upper end. The valve member 26 is rotatably mounted by an anti-friction type thrust bearing 28 supported by said sleeve 24 and properly positioned by a screw cap 27. Four such toothed wheels 29 are arranged in a horizontal row at definite space intervals on the machine and driven from the aforementioned driving gear 16 through intermediate gears 29', thus all the wheels 29 revolving continuously in the same direction, when the machine operates. The sleeve 24 is provided with a material supply opening 30, communication of which with the inner space of said sleeve is controlled by the recess 25 provided on said rotary valve member in a proper time relation relative to other sets of bottle makers. Thus, feeding of fused material to four sleeves 24 is carried out successively in a regular order.

The sleeve 24 is fixed to the die by means of set screws 31. Upper tubing mold 32 is fixed by means of, for instance, screw connection, as shown, to the lower end of said sleeve 24 and lower tubing mold 34 is fixed to the lower part of said mold 32 by means of a plurality of fixing bolts 33, said mold assembly including therein a core 35, thus leaving a moulding space 36 therebetween. The core 35 is provided with an air supply passage 37 bored therein axially and extending over nearly whole length thereof. An air supply piping 38 is connected from outside to said passage 37.

The tubing mould assembly consisting of three members 32, 34 and 35 serves to extrude thus provisionally formed tubing at a proper speed. Under said tubing mould assembly, there is a bottle proper forming mould 39 having substantially a cylindrical shape. This mould is connected with said assembly by screw connection and arranged to receive the tubing fed from said assembly.

Upper and lower moulds 32 and 34 can be easily dismounted from the machine by unscrewing screws 31 and bolts 33, thus enabling an easy exchange of core 35 in order to adjust the width of said moulding space 36 and thus to obtain the required wall thickness of the tubing to be fed.

Beneath the bottle proper forming mould, there is neck forming device 40 provided on a supporting plate T (see FIGS 9, 10 and 11). This device is provided with split moulds 41 mounted on slides 42, which are slidable along a plurality of guide rods 43. These guide rods 43 are supported by pedestal bearings 100 and 101 fixed on said plate T. Each rod 43 is provided with a compression spring 44, which urges the slides to separate from each other. Each slide is provided with a roller support 45 fixed thereon, which rotatably supports a cam roller 46, said roller being operated by a cam 47 or 48 arranged at the outer side of each slide, but separated therefrom. Thus, split moulds are arranged to engage with each other in a compact mass by the action of said cams 47 and 48, and to be separated from each other by the influence of springs 44.

The number of sets of neck forming devices 40 corresponds naturally to that of bottle manufacturing units, denoted generally, in this case, by reference characters A, B, C and D in the drawings. For four sets of said manufacturing units, as in the present case, the operative sequence of said cam sets is such that there is a phase difference of 90 degrees between any neighbouring two sets of cams. When six manufacturing units are provided on the machine, the phase difference will naturally amount to 60 degrees. With such phase differences, all cam sets to control neck forming devices 40 operate in succession.

The air supply control valve assembly is arranged, on the supporting frame 49 fixed to machine frame 1 in the neighbourhood of transmission mechanisms from the electric motor 2 (see FIGS. 1, 2, 3, 7 and 8), said valve assembly comprises, in this case, four valve units, denoted generally in the drawings by reference characters $a$, $b$, $c$ and $d$, which correspond to bottle manufacturing units A, B, C and D, respectively. These valve units are arranged radially at 90 degree intervals. In each of said valve units, a valve member 51 is movably mounted in a screw cap 102, and normally closes under the influence of valve spring 55 the valve openings cut through a valve seat disc 103, which is fixed within said cap. A valve rod 52 is fixed with said valve member 51, said rod being provided with an engaging piece 54 kept in contact with a cam 63 by said spring action. Bellows 53 encloses substantial part of said piece 54 except the working point thereof, the opposite end of said bellows being tightly fixed to the lower end of a sleeve or cylinder 104. 56 represents an air relief device attached to each of valve units, and contains small two chambers 105 and 106 separated by a wall 58, but communicates with each other through a small vent hole 57 cut through said wall. One of said chambers 105 is connected to the inner space of said cylinder 104, while the other chamber 106 communicates with the open atmosphere through a second vent hole 59 cut through the end wall of the casing enclosing said two chambers. Compressed air conveyed through pressure piping 60 enters first into the inner space of the cap piece containing said valve spring 55, thence through valve openings in the valve seat disc 103, when the valve is opened, into the inner space of said cylinder, with which is connected an air delivery piping 61 by means of a screw connection as shown. The delivery piping 61 from the valve unit $a$ leads to the air supply piping 38 for the bottle manufacturing unit A. Similar connections are also provided between units $b$ and B, $c$ and C, as well as $d$ and D, respectively. Compressed air is conveyed from an air reservoir (not shown) through main piping 62 to each of said pipings 60 provided for each of said air supply control valve units. At the centre of said valve assembly, there is a shaft 11, upon which is fixed said cam 63. When the shaft 11 is rotated continuously as described more in detail hereinafter, valve rods 52 are pushed outwardly through the intermediary of engaging pieces 54, successively, for instance, in the order of $a$, $b$, $c$ and $d$.

Now, the arrangement of four sets of operating cams for neck forming devices, and the cooperating mechanism arranged between air supply control cam and aforementioned four sets of operating cams, shall be explained in detail:

The already mentioned side shaft 9 extends horizontally, in FIG. 1, from the right hand end of the machine to the chain wheel 10, seen at the nearly right hand end thereof, and provided with bevel gears 65 and 65′, fixed nearly at both ends of said shaft, respectively, said bevel gears mesh with mating gears 66 and 66′, respectively, which are fixed on the lower ends of vertical shafts 67 and 67′, respectively. These vertical shafts extend through said supporting plate T relatively high thereabove, these shafts being provided with bevel gears 68 and 68′ at their upper ends, respectively, which gears, in turn, mesh with their mating gears 76 and 76′ fixed on both ends of cam shaft 72. In the front and behind of a plurality of bottle manufacturing sets A, B, C and D, there are mounted on said cam shafts 71 and 72, respectively, which are rotatably mounted in brackets 69, 69′, 70, 70′ fixed on said plate T. Said shafts are provided with chain wheels 73, 74 and 73′, 74′, respectively, these between connects chains 75 and 75′, in the usual manner. Thus, both longitudinal cam shafts 71 and 72 are arranged to rotate in the same direction. Every set of co-operating cams 47 and 48 is mounted on these shafts, successively with 60 degree phase differencies, and at the same time symetrically for each cam set.

As clear from the foregoing, rotation is transmitted from motor 2 through shafts 4, 6, 9 and 11, and chain 90, to vertical shaft 15, on the one hand, to operate a set of driving gears 29 for the rotary valves 26 controlling fused material feeding to each of bottle manufacturing sets, and, on the other hand, rotation is transmitted from side shaft 9 through vertical shafts 67, 67′ and longitudinal cam shafts 71, 72 to the operating cam sets for bottle neck forming devices having split moulds 41. At the same time, the air supply controlling valve assembly mounted at one end of said cam shaft 11 is operated. In this way, in connection with four bottle manufacturing sets A, B, C and D, four rotary valves controlling the material feeding therefor, four sets of operating cams for bottle neck forming devices and four air supply control valves are operated in a proper operating sequence one after another.

The supporting plate T is arranged to be moved up and down as desired. As clearly shown in FIG. 4, the plate T is provided with two vertical slides 77 and 77', extending downwardly and being guided by stationary guides 78 and 78', respectively, engaging in a tongue and groove relation therewith. Said guides are fixed on the machine frame 1 and said vertical slides are provided with two sets of racks 79 and 79' fixed thereon. Each of said guides is 78, 78' provided with bearings 81 and 81', in which the operating shaft 80 is rotatably mounted. On both ends of the operating shaft 80 are fixed worms 82 and 82', with which worm gears 83 and 83' co-operate. The worm gears 83 and 83' are fixed on one side ends of lateral shafts 84 and 84', respectively, each of which is provided with pinions 85 and 85' meshing with said racks 79 and 79', respectively. It is clearly understood from the foregoing, that when operating handle 86 is rotated in one or the other direction as desired, the supporting plate T is moved up or down. With the plate at the lower position, the operator may have an easy access to the tube forming and moulding arrangements.

There is a water cooling jacket 87, surrounding each of bottle proper forming moulds, so that these moulds can be effectively cooled. The water for the purpose is supplied from a tank not shown through a supply pipe 88 to said jacket 87. Warm water is discharged therefrom through a discharge pipe 89.

The working modes of the present machine are as follows:

Synthetic resin chips, for instance polyethylene, are at first charged in the hopper 18, from which they drop into the heating and feeding cylinder 23 and are brought to fluidized state at an elevated temperature as in the case of usual procedures. The feeding screw rotating therein (not shown) feeds the molten resin to the passages 22 through common passage 21 provided in die 20. As already explained, the rotary valves 26 are continuously rotated. Thus, when the recess 25 on said rotary valve belonging to bottle manufacturing set A is brought into such a position that it meets the opening end 30 of the corresponding branch passage 22, the fused material is fed therethrough into the inner space of the corresponding sleeve or cylinder 24. In the similar way, the remaining sleeves 24 belonging to other manufacturing sets B, C and D are successively supplied with molten material from the feeding cylinder through a common passage 21 and a plurality of branch passages 22, in a predetermined operative sequence. Such an automatic and selective supplyment of molten material from a common duct having a plurality of branch passages provides a simple construction of feeding mechanism and eliminates much troubles otherwise to be encountered in this relation.

The fused material supplied, in the aforementioned manner, into the inner space of each sleeve 24, flows under pressure into the moulding space 36 of the co-operating, tubing mould assembly. When thus fed material amounts to a predetermined quantity, said opening 30 is closed by further rotation of valve member 26. Substantially at the same time, a set of cams 47 and 48 operate to urge the slides 42 through cam rollers 46 to move inwardly against the action of compression springs 44, thus closing the split moulds 41 belonging to bottle manufacturing unit A. This kind of mould-closing operation is carried out in the similar way in succession for the remaining units B, C and D. During this mould closing operation, a tubing already formed in the tubing mould is pushed out therefrom into the co-operating, bottle proper forming and neck forming moulds tightly combined in a unit assembly. At the same time, the operating cam 63 fixed on the cam shaft 11, operates to open the valve member 51 belonging to air supply control valve unit a, thus compressed air enters from pressure piping 60 through valve unit a, delivery piping 61, air supply passage 37 bored in the core 35, in the bottle making mould assembly, thus swelling said tubing onto the inner wall surfaces to form a bottle. The moulds are effectively cooled, as already explained hereinbefore, by the water circulating through water jacket 87. With further rotation of the operating cams 47, 88, the pressure exerted therefrom indirectly onto the mating split moulds 41 is released, and the co-acting slides supporting these split cams retard from their operating position under the influence of compression springs 44. Thus, the bottle proper forming device is opened at its lower end. Under these conditions, the shaped product bottle 106 in the inverted state appears from said device and drops under gravity action. This process explained just above, will be also carried out for the remaining manufacturing sets B, C and D, in succession.

The abovementioned operations are continuously repeated with four manufacturing units A, B, C and D in succession, thus completing the desired hollow products one after another.

The operating surface of each cam for neck forming device varies in four stages. During range I, the co-operating split cams are closed together tightly and during range II, they begin to open. Within range III, they are completely opened, while within range IV, the moulds start to close.

Figure 13:
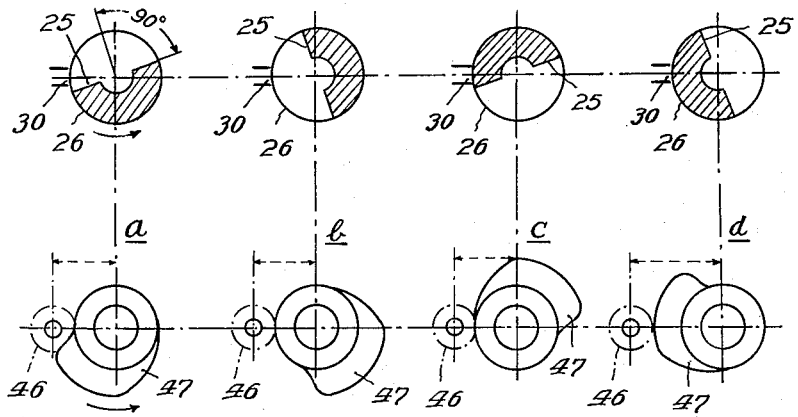
FIG. 13 represents a plurality of phase diagrams, illustrating the phase relations between the operation of a rotary valve to control the material feed to the manufacturing unit, on the one hand, and that of the operating cam to control the movement of slides, on which said split moulds are rigidly mounted, on the other hand.

Now, referring to FIG. 13, the phase relations between the operation of a cam for each bottle neck forming device and that of the corresponding rotary valve controlling the material feed to the moulding assembly, shall be explained further in detail. The operation of the rotary valve is carried out in a definite relative phase relation with that of the cam controlling the opening and closing of the neck-forming split moulds, as shown in a, b, c and d in the drawing. As is clearly seen from the drawing, the rotary valve operates perfectly in a matched relation to the operation of said air supply controlling cam.

At the time, shown in a, FIG. 13, the control surface of the cam occupies a position directly after its disengagement from the co-operating cam roller, thus the split moulds being at the beginning of separation, while the rotary valve is brought to a position, in which the controlling recess coincides with material inlet opening, thus permitting the fused material fed from the die to flow into the inner space of said sleeve or cylinder 24.

In the situation shown in b, split moulds and rotary valve are both kept fully opened. In this case, the material is fed into the corresponding sleeve, until the desired quantity is attained.

In the position shown in c, the rotary valve closes said inlet opening, thus the material being prevented from flowing in, while the operating cam urges the cam roller to begin closig of the split moulds. At the same time, the material contained in the tube forming mould assembly begins to be fed, in a tubing, to the bottle proper forming device.

In the situation shown d, the operating cam pushes the co-operating roller at its extremity, thus the split moulds being brought into tight engagement with each other. The material tube has been completely fed into said device, thereupon the air supply control valve unit a is opened by the operating cam, thus compressed air being supplied in the hollow space of the material tubing. Finally, the operating conditions transfer from d again to a.

Meanwhile, in the remaining manufacturing sets, the corresponding cams and rotary valves operate in the similar way as just described, but successively with phase differences by ¼ revolution. Thus, similar operations are repeated in succession one after another, but with substantial overlapping.

At the same time, the common operating cam 63 operates, in the similar way, the control valves b, c and d, When the cam rise passes over the valve rod, the latter returns instantly to its closed position by the action of bellows 53 and spring 55. During this closing time, until the cam rise again reaches the operating position, pressure air will escape through vent holes 57 and 59, in order to keep the pressure prevailing in the sleeve 104 at an appropriate value, thus ensuring safety compressed air charging. Although some quantity of air will escape through said vent holes to the open atmosphere during the operating period of said common cam 63, it does not influence seriously upon the required air charging operation to swell the provisionally made tubing onto the inner surface of the bottle forming mould assembly. In the foregoing, the explanation has been made with four sets of manufacturing units. It is clear, however, if six or more said units are employed, the productive efficiency will be substantially increased. It is also possible that when proper adjustments are made upon the strokes of the reciprocating constituents, kinds and natures of the material resin, temperature and pressure thereof, still further higher efficiency and larger output can be realized.

Figure 14:
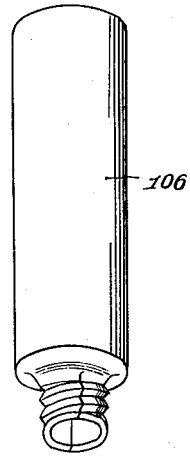
FIG. 14 represents a perspective, enlarged view of the product, but by way of example.

As already explained, the bottle proper forming mould is of the shape of a cylinder and consists of one piece with no split seams. Split seams are present in relatively smaller split moulds assembly only. Thus, as shown in FIG. 14, the product is substantially seamless and has good appearance and high toughness, thus providing superior results.

As the split mouldings are arranged to occupy the lower position of each manufacturing set, each product may be easily taken out by the help of gravity action, when the split moulds are opened. The split moulds are made relatively smaller than the integral moulds, thus providing simpler construction of the driving or operating mechanisms necessary therefor, as well as easier operating facilities.

The tube moulding space between the corresponding moulds and the co-operating core may be said to be a preparation chamber by such a reason that when, according to this invention, compressed air having an elevated temperature, for instance, between about 60 and 70° C. is supplied, the tubing formed in said space or chamber is relieved from local stresses, which may otherwise happen to take place, thus providing smooth and high quality goods. Furthermore, the allowable expansion rate between the inside diameter of tubing and that of the finished goods, may be thereby exceedingly increased. As an example, with a tubing thus formed has a wall thickness of 0.2–0.3 millimeter may be swelled out to products having a wall thickness of about ¼ the original value. With a tubing having a wall thickness of 1–2 millimeters, about ⅕ time thinner products may be produced. According to this invention, a higher expansion rate of tubing by about 40% as compared to conventional methods can be attained.

Although only one particular embodiment of the invention is herein disclosed for purposes of explanation, various further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Machine for the production of hollow goods of synthetic resin, comprising, a hopper, a heating and feeding cylinder connected therewith, a common die for a plurality of manufacturing units on the machine and adapted to receive molten material fed from said cylinder, said die being provided with a common passage and a definite number of supplying branch passages kept in communication therewith, a corresponding number of cylinders mounted on said die, a rotary valve movably mounted in each of said cylinders, said valve being provided with a recess to control the inlet of the fed material to the corresponding manufacturing unit, as well as provided with a driving gear attached to its head portion, a corresponding number of tube forming devices adapted to receive molten material controlled by said rotary valves, a swelling means connected with each of said tube forming devices, means to feed pressure medium to said swelling means, a seamless mold arranged to co-operate with each of said swelling means, a prime mover, a speed change gearing driven therefrom, a side shaft driven through gearing from said speed change gearing, two cam shafts driven through vertical shafts and worm gearings from said side shaft, means to feed pressure medium to said swelling means, a valve assembly to control the pressure medium feeding in a successive order, said assembly comprising a corresponding number of valve units radially arranged and operated by a common cam at the center of said assembly, an intermediate shaft operatively connected to said side shaft and carrying said common cam at one end, a driving gear driven through a vertical shaft and a worm gearing from said intermediate shaft and adapted to drive a gear train including intermediate gears and said rotary valve driving gears, a split neck mold assembly arranged to co-operate with each of said seamless molds, a plurality of second cams mounted on said cam shafts and adapted to drive intermittently said split mold assemblies to their working positions successively and in a proper timed relation to said material feeding, said tube-forming, and said swelling and pressure medium supplying, each of said manufacturing units comprising said latter cylinder, said rotary valve, said tube forming devices, said swelling means, said seamless mold and said mold assembly.

2. Machine according to claim 1, further comprising a transmission of chain type adapted to drive said cam shafts in the same direction, said second cams to drive said split mold assemblies being fixed on said cam shafts in symmetrical manner.

3. Machine according to claim 1, further comprising a plate supporting said plurality of split mold assemblies, said plate being fixed to slides which are maually adjustable in height.

4. A machine for producing hollow goods, comprising a plurality of molds arranged in a line, means for extruding a tube of plastic material into each of said molds, means for feeding plastic material to said extruding means including a common passage extending along said line of molds and branch passages leading from said common passage to said extruding means, a rotary valve in each of said branch passages for controlling the flow of plastic material from said feeding means to said extruding means, means for rotating said valves including means interconnecting said valves in selected phase relation to operate said valves to open successively, with said common passage continuously in communication with at least one of said extruding means, expanding means associated with said extruding means and molds to supply pressure fluid to the interior of the tubes extruded by said extruding means into said molds, means for supplying fluid pressure to said expanding means including valve means controlling supply of pressure fluid to said expanding means and means for operating said valve means in timed relation with the operation of said rotary valves to supply pressure fluid to expand extruded tubes successively when said tubes are extruded into said molds, each of said molds comprising a one-piece seamless mold.

5. A machine according to claim 4, in which said extruding means is disposed at the upper end of each of said molds and in which a divided neck mold is associated with the lower end of each of said one-piece molds.

6. A machine according to claim 5, in which means is provided for opening said divided neck molds successively in timed relation with the operation of said rotary valves and expanding means to open said neck molds after the expansion of said tube.

7. A machine for producing hollow molded goods, comprising a plurality of molding units arranged in a line, each of said units comprising a seamless mold vertically arranged, extruding means disposed at the upper end of said mold and operable to extrude a tube of plastic material into said mold, means for expanding said tube, and a split neck mold assembly disposed at the lower end of each of said seamless molds and operable to open and close, means for feeding plastic material to said extruding means including a common passage extending along said line of molding units and branch passages leading from said common passage to said extruding means, a rotary valve in each of said branch passages for controlling flow of plastic material from said common passage to said extruding means, means for rotating said valves including means interconnecting said rotary valves in selected phase relation to open successively, means for supplying pressure fluid to said expanding means including valve means controlling the supply of pressure fluid to said expanding means, means for opening said split neck mold assemblies and means for actuating said valve means and mold opening means in timed relation with the rotation of said rotary valves.

8. A machine according to claim 7, in which said valve means comprises a plurality of valve units disposed in a circle, each valve unit comprising a cylinder, a cap screwed on said cylinder, a valve member movably arranged in said cap, a valve disc fixed in said cap and provided with a plurality of openings, a valve rod fixed to said valve member, said rod extending through said disc and cylinder and projecting radially inwardly toward the center of said circle, spring means biasing said valve member towards said disc to valve closing position, and rotating cam means concentric with said circle and engageable successively with said valve rods to move said valve members to valve opening position.

References Cited in the file of this patent

UNITED STATES PATENTS

| | | |
|---|---|---|
| 2,128,239 | Ferngren | Aug. 30, 1938 |
| 2,632,202 | Haines | Mar. 24, 1953 |
| 2,724,860 | Strong | Nov. 29, 1955 |
| 2,871,516 | Sherman | Feb. 3, 1959 |